July 21, 1936.  H. T. KRAFT  2,048,635
TIRE TREAD
Filed Nov. 21, 1934  4 Sheets-Sheet 2

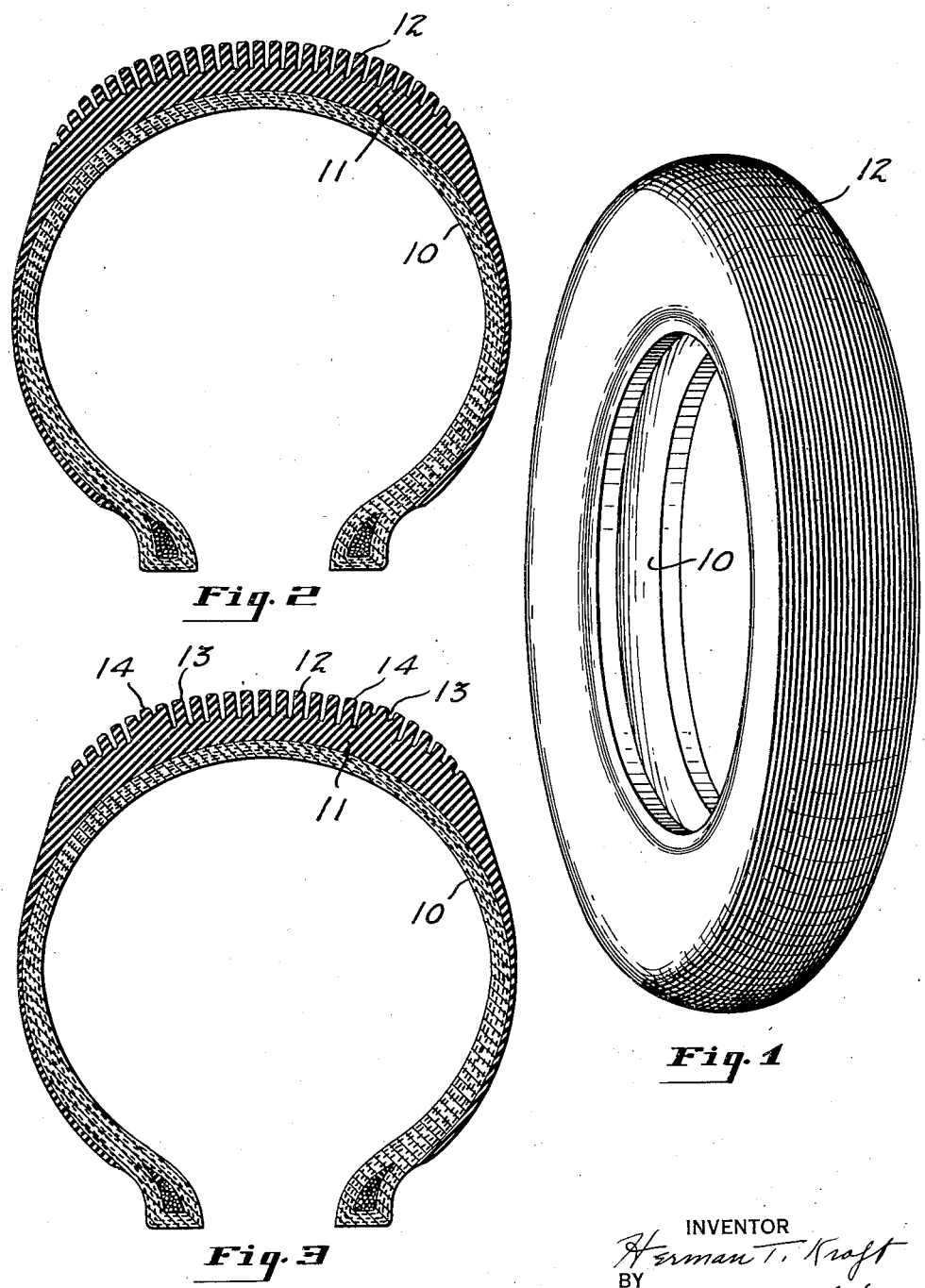

INVENTOR
Herman T. Kraft
BY
Evans & McCoy
ATTORNEYS

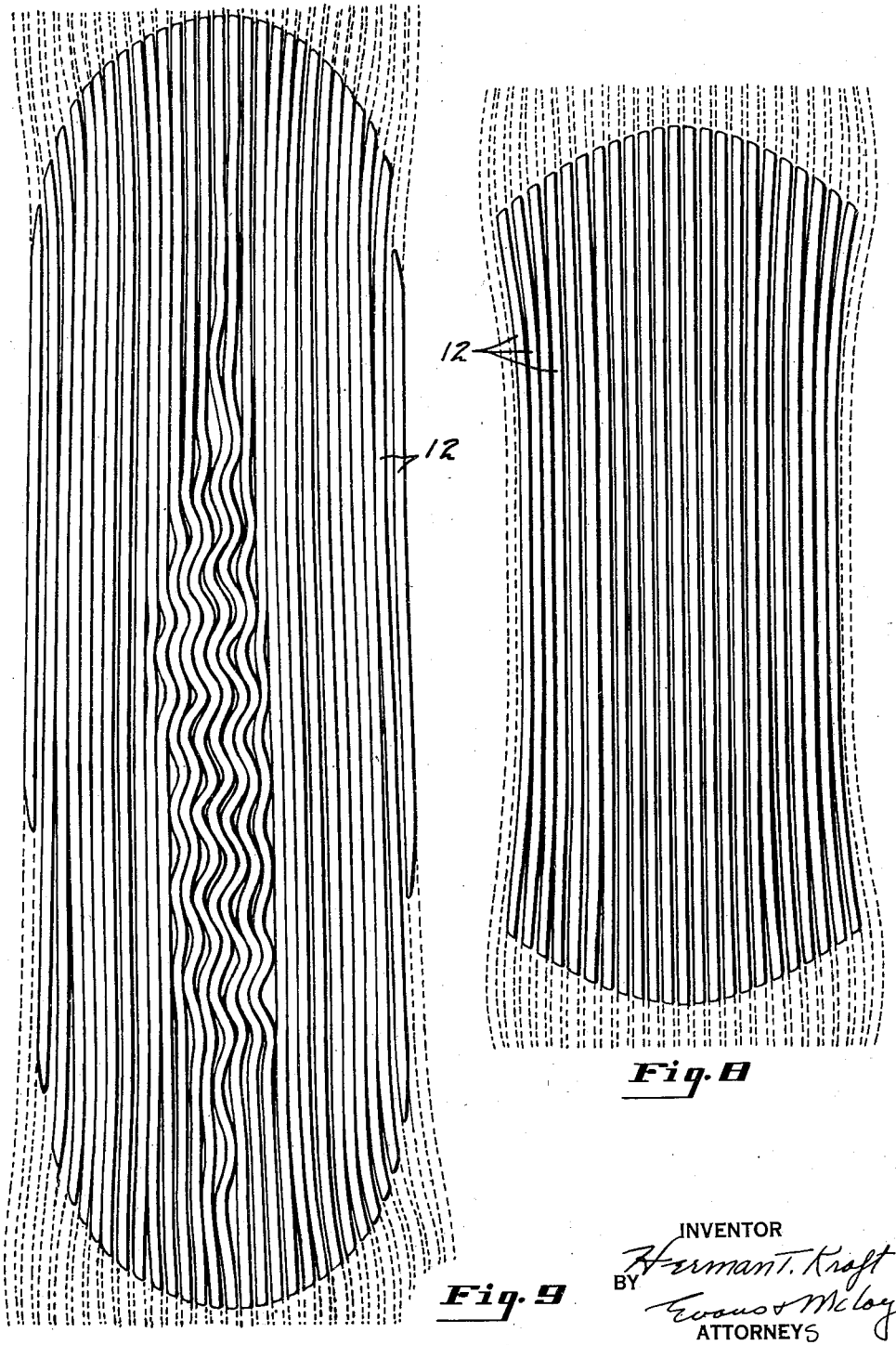

July 21, 1936.　　　　H. T. KRAFT　　　　2,048,635
TIRE TREAD
Filed Nov. 21, 1934　　　　4 Sheets-Sheet 4

INVENTOR
Herman T. Kraft
BY
Evans & McCoy
ATTORNEYS

Patented July 21, 1936

2,048,635

UNITED STATES PATENT OFFICE 2,048,635

TIRE TREAD

Herman T. Kraft, Akron, Ohio, assignor to The General Tire & Rubber Company, Akron, Ohio, a corporation of Ohio Application November 21, 1934, Serial No. 754,104

10 Claims. (Cl. 152—14)

This invention relates to tires and more particularly to an improved tire and tread therefor.

One of the objects of the present invention is to provide a tire having an improved tread which provides for a greater flexibility of the tire carcass and a greater distribution of the flexing in the carcass, which enhances the durability and life of the tire carcass.

Another object is to provide a tire with a tread of improved construction which has a greater road gripping action and is more resistant to skidding than previously known tire treads.

Another object is to provide a tire with a tread which is more silent in operation than previously proposed treads.

Another object is to provide a tire with a relatively durable tread which is flexible in itself and which adjusts itself to road irregularities.

Another object is to provide a tire with an improved tread having for the most part a series of relatively narrow, separated portions of greater depth than width, each of which is laterally unstable and may flex into engagement with the adjacent portions when subjected to road contact, and which provide for greater road gripping action and resistance to skidding.

With the above and other objects in view, the present invention comprises certain features of construction to be hereinafter described with reference to the accompanying drawings, and then claimed.

In the drawings, which illustrate suitable embodiments of the invention,

Figure 1 is a perspective view of a vehicle tire showing one embodiment of the improved tread;

Fig. 2 is an enlarged transverse section through a tire of the character shown in Fig. 1, showing the tread in detail;

Fig. 3 is a view similar to Fig. 2, showing a modified tread;

Fig. 8 is a diagrammatic view of the tread of Fig. 2 in plan showing the form that the finlike portions may take when subjected to a static load;

Fig. 9 is a diagrammatic view of the tread of Fig. 2 in plan showing the form that the finlike members may take when subjected to a braking action;

Figure 4:
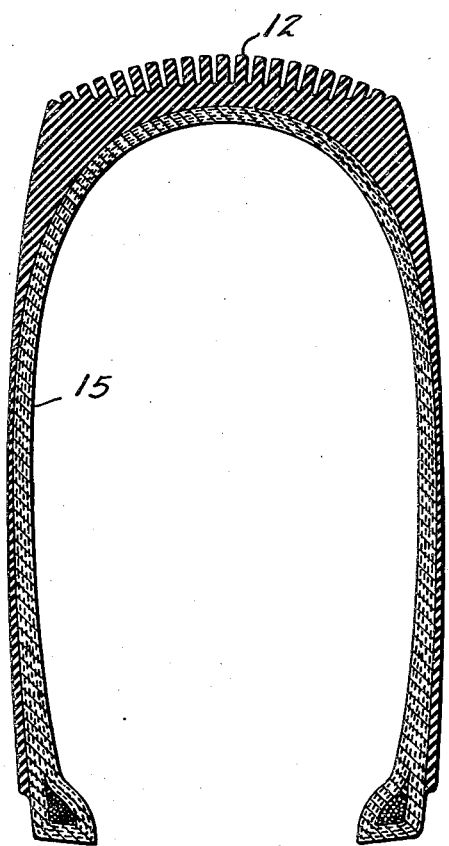
Fig. 4 is a section taken through a tire of different form, in which the tread illustrated in Figs. 1 and 2 is incorporated.

Broadly stated, the present invention comprises a tire having a tread portion consisting for the most part of a plurality of relatively narrow, inherently flexible finlike portions of materially greater depth than width, which are laterally unstable and which may flex and yield transversely under load into engagement with adjacent portions to provide greater tractive effort, and which provide for a greater flexibility of the tire carcass.

Referring to the accompanying drawings, in which like numerals refer to like parts throughout the several views, I have shown in Figs. 1, 2 and 3 a pneumatic tire casing of conventional sectional shape having a carcass 10 and a tread portion 11.

In the construction shown in Figs. 1 and 2, the road contacting portion of the tread portion 11 consists of a plurality of relatively narrow, closely spaced portions in the form of ribs 12 which normally project radially from the base of the tread portion 11. As shown in Figs. 1, 2 and 3, these ribs 12 are parallel and extend continuously about the tread portion 11 in a circumferential direction. Each rib 12 is of materially greater depth than width, and the space between each pair of adjacent ribs 12 is preferably less than the width of a single rib 12.

In Fig. 3, I have shown three groups of finlike ribs 12, each group being separated from the next adjacent group by a wider rib 13 of substantial depth, which, if desired, may be provided with a number of shallow ribs or corrugations 14 on its circumferential surface corresponding in width to the finlike members 12. The ribs 13 are relatively stable laterally and act as a stabilizing means during the operation of the tire, when such is desired.

Figure 6:
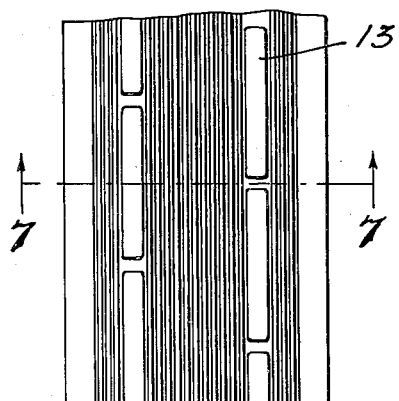
Fig. 6 is a fragmentary plan view of a further modified tread.
Figure 7:
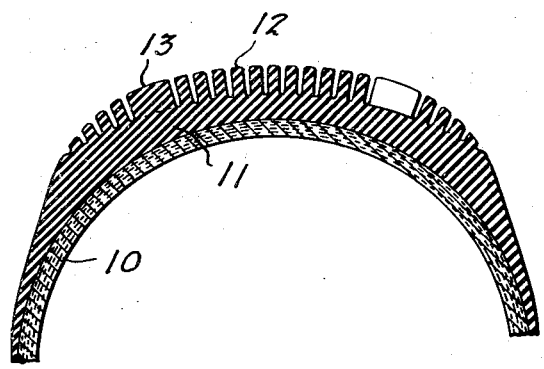
Fig. 7 is a section taken approximately on line 7—7 of Fig. 6.

In Figs. 6 and 7, I have shown a construction similar to that of Fig. 3, but in this case the stabilizing ribs 13 are not provided with the shallow ribs or corrugated as in Fig. 3, but are each divided into circumferentially spaced segments as shown in Fig. 6. The stabilizing ribs 13 shown in Fig. 3, if desired, may also be divided into similar segments.

In Fig. 4, I have shown a tire casing 15 of the general character shown in U. S. Letters Patent No. 1,969,088 of Alger Maranville, issued August 7, 1934, in which the tread portion is provided with a series of narrow, finlike portions 12 of the same character as those shown in Fig. 2.

Figure 5:
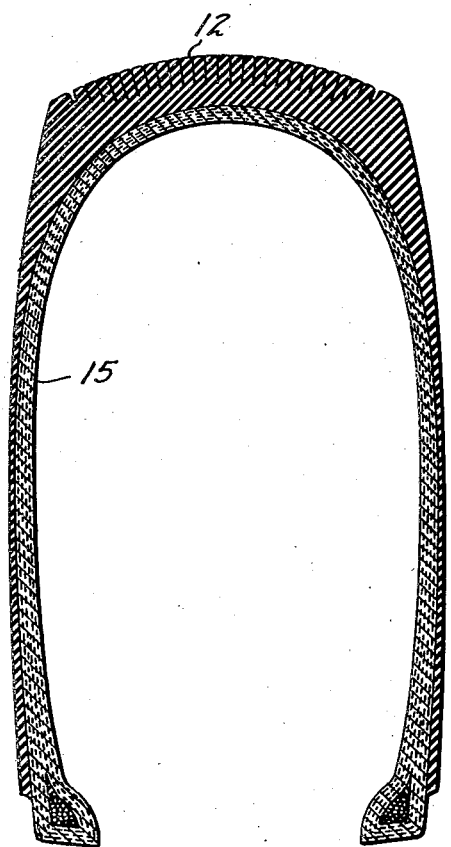
Fig. 5 is a section similar to Fig. 4 showing a modified tread.

In Fig. 5, which shows a tire casing 15 similar to the one illustrated in Fig. 4, I have shown the tread portion as having relatively narrow finlike ribs 12 similar to those previously described, but in this construction the finlike ribs 12, although being disconnected from each other, substantially abut each other as shown.

The finlike ribs 12 shown in each of the views resemble a series of radially projecting fins separated from the adjacent portions and are very flexible and capable, because of their lateral instability, of distorting or flexing transversely when subjected to radial and/or axial pressures under load.

While I have shown each of the finlike ribs 12 as continuously extending around the tire casing in a circumferential direction, it is to be understood that they may be arranged in other manners. For example, the ribs 12 may be arranged to provide a herringbone effect, the ribs 12 originating from a central rib or groove located at the median plane of the tire casing.

Also, if desired, the finlike ribs 12 may be formed similar to a series of low pitch screw threads, providing one or more continuous ribs 12 originating at one side of the tire casing and extending circumferentially about the tire casing a plurality of times and then terminating at the opposite side thereof.

Figure 10:
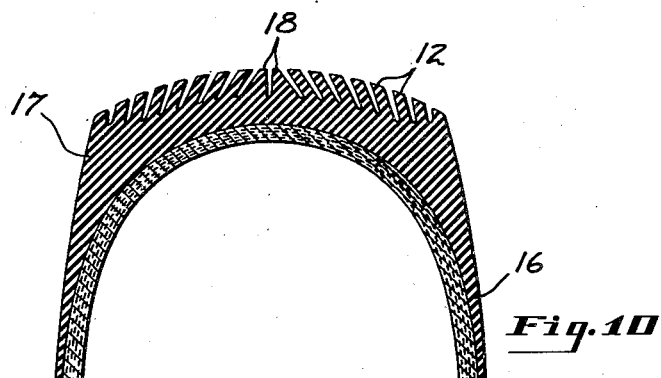
Fig. 10 is a section similar to Fig. 4 showing a different embodiment of the present invention.
Figure 11:
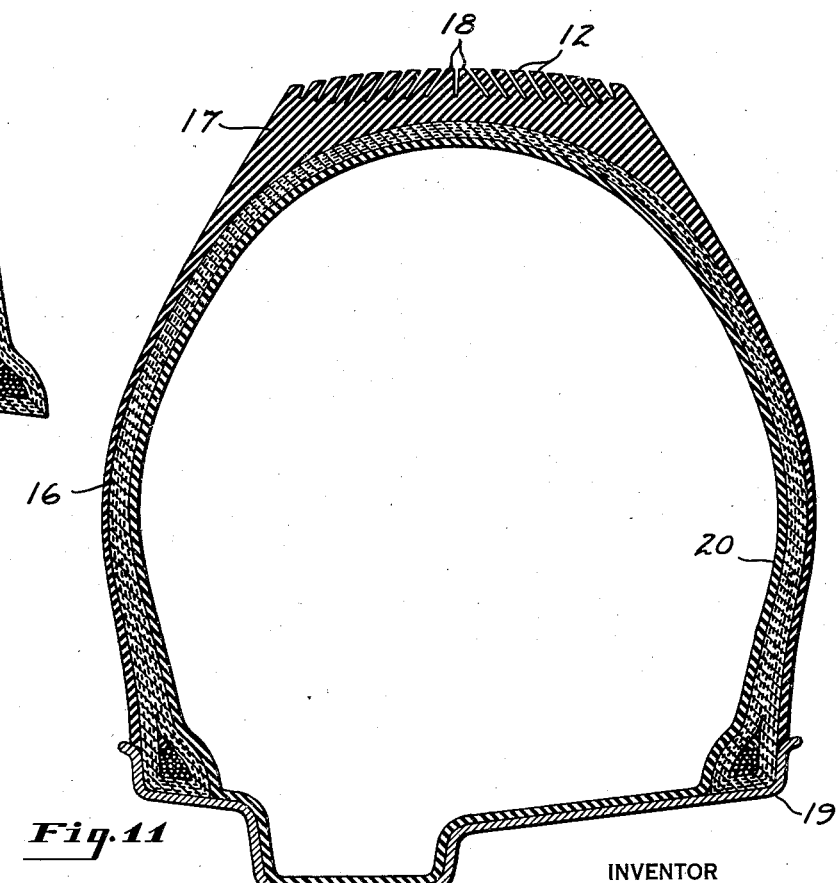
Fig. 11 is a sectional view of the tire shown in Fig. 10, showing the same in inflated condition on a wheel rim.

In the embodiment shown in Figs. 10 and 11, the tire casing 16 is provided with a tread portion 17 having narrow finlike ribs 12 projecting from the base thereof, but in this construction the ribs 12 are inclined from the vertical, those ribs 12 at one side of the median plane of the tread being inclined from the tread base towards the median plane, and those ribs 12 at the other side of the median plane also being inclined from the tread base towards the median plane. If desired, the tread portion 17 may be formed with closely spaced circumferential ribs 18 of triangular shape at the median portion of the tire between the two series of inclined finlike ribs 12.

The ribs 12 in the tread shown in Figure 10 are preferably so formed that when the tire casing 16 is mounted on a rim 19 and inflated through the medium of an inner tube 20, the ribs 12 of each group move substantially into parallel relationship, as shown in Fig. 11.

The particular arrangement, however, of the narrow projecting ribs 12 is not so important so long as the major portion of the tread surface throughout the width and circumference thereof is composed of separated, relatively narrow, outwardly projecting finlike portions which are of such a depth and of such lateral instability that when subjected to normal tire load conditions they may yield or flex transversely substantially throughout their entire radial depth at the region of road contact and may engage each other.

As seen from Figs. 8 and 9, which represent a tread of the character illustrated in Fig. 3 under load, some of the finlike ribs, because of their lateral instability, flex laterally into engagement with each other to provide a nonskid tread pattern composed of a multitude of individual tread surfaces, any one of which may compress radially inwardly without substantial regard to the others. The tread pattern may vary according to the load pressures and the contour of the road surface, and the portions 12 assume their normal radially projecting parallel positions when the load is removed.

Referring to Figure 8, which illustrates the tread pattern of the tread of Fig. 3 under a normal static load, it will be noted that some of the finlike portions 12 in the road contact area are in engagement with each other and present a tread pattern of hourglass appearance. The individual ribs are flexible, elastic and relatively weak. However, the tread surface is composed of a relatively large number of these ribs, the number of ribs being sufficient to carry the weight of loads such as normally applied to the tire without substantial distortion. This is shown in Fig. 8, which shows the individual ribs of the ground-engaging portion of the tire substantially straight. The individual ribs do not collapse because the weight is distributed over a large number of ribs, and any ribs deflected laterally by the load are held in nearly upright position by adjacent ribs.

The parallel ribs supporting the load form an elastic cushion between the tread body to which the ribs are attached and the road surface. The ribs, being laterally unstable, will yield readily to lateral thrusts and, being elastic and stretchable, they provide an elastic connection between their road-engaging edges and the tread body so that, in the direction of travel as well as laterally, they provide an elastic cushion between the tread body and the road surface. In traveling around curves the lateral thrust of the vehicle causes the ribs to flex laterally and permit a slight movement of the vehicle in the direction of thrust without any slip between road surface and tire. This cushioning action is continuous, each portion of the ribs coming into contact with the ground being flexed in the same way. In traveling around a curve this cushioning action of the tread permits the vehicle to have a lateral movement with respect to the normal line of travel without any slip between the road surface and the tire treads. The yielding cushion, together with the high resistance to lateral slip provided by the ribs, is highly effective in preventing side slip in passing around curves at high speeds. However, when the tread is subjected to traction such as under a driving or braking condition, this tread pattern may change according to the magnitude of the tractive effort. Referring to Figure 9, which illustrates the tread pattern produced by the application of a severe braking action when the tread under the same load is operating over a plane surface, it will be noted that many of the finlike portions remain in engagement but that they flex substantially independently of each other and present a nonskid tread pattern of serpentine appearance, the finlike portions actually stretching during this change in tread pattern and providing a plurality of spaces to expose a plurality of edges to resist the tendency towards slipping. The tread patterns of Figs. 8 and 9 are reproductions of photographs taken of an actual test of a 5.50 x 17 tire having the improved tread of the present invention, and inflated to 25# per square inch air pressure. This test was accomplished by supporting a wheel having the tire thereon adjacent a heavy glass plate through which the appearance of the tread under load could be observed. A static load of 1050 pounds was imposed on the tire through the wheel axle mounting and this gave the tread pattern illustrated in Fig. 8. Then, the wheel and tire were locked against rotation, and without changing the air pressure of 25# per square inch or the load of 1050 pounds, the plate was moved in its plane and in a direction at right angles to the tire axis to simulate a severe braking action, the pressure tending to move the plate being such as to substantially cause slipping of the plate relative to the tread. This resulted in the actual change in tread pattern illustrated in Fig. 9.

The group or groups of finlike portions 12, because of their flexibility resulting from lateral instability, provide a much softer tread as compared with conventional treads which tends toward a softer ride. This in itself is a material advantage as the softer tread reduces the rigidity and provides for greater flexibility of the tire carcass, and a wider distribution of the flexing in the tire carcass. The increased flexibility of the tire carcass renders the carcass more durable and materially enhances its life by reducing the internal heat. The large surface area which is provided by the many finlike portions and the continual working of the finlike portions also tend toward the reduction of heat in the tire carcass, as a greater area of the tread is exposed to the atmosphere than in conventional treads. Since the tire carcass is rendered more flexible, a tire of the character described will have a greater enveloping factor, allowing the shocks which occur from the passage of the tire over articles in the road to be absorbed by the tire and not be transmitted to the vehicle body.

The novel tread construction of the present invention also presents many other material advantages. In the first place increased traction and increased resistance to skidding is provided. This arises from the increased coefficient of friction resulting from the multitude of road engaging surfaces of the tread and the flexibility of the finlike portions 12. Each finlike portion 12 when under load, i. e., when in engagement with the road surface, is free to flex independently of the other members because of its lateral instability, allowing the road engaging surface of each portion 12 to adjust itself to road irregularities without disturbing the tractive engagement of the other portions 12 with the road. The finlike portions 12, by reason of their number and flexibility, also resist skidding action particularly on wet pavements, as they provide a nonskid pattern.

These many finlike portions provide a construction in which the tire will operate very silently. Also, squealing noises such as occur when rounding curves on dry pavements are reduced.

Since the finlike portions 12 are flexible, the flexing of the same when they assume their normal positions releases any small particles which may become lodged between the portions 12.

During the vulcanizing of tires having a tread of the character described, it may be necessary to provide small fins extending transversely between the members in order to prevent the formation of air pockets in the vulcanizing mold. Any such fins should be removed by a cutting operation or with a burning tool before the tire is used.

A vehicle tire having a tread construction of the character described is a marked departure from tires heretofore known and possesses characteristics heretofore unknown in the tire art, which materially add to safety and quietness of operation and to the durability and life of tires, particularly pneumatic tires used for motor vehicles, aircraft, motorcycles and bicycles.

The construction shown in Fig. 5 is particularly adaptable for aircraft tires, as such a tread offers no increased wind resistance and yet provides for the desired tractive effort where the tire is operated, as in taxiing.

Wherever the term "finlike portion" is referred to herein and in the appended claims, it is to be understood that such term shall mean a tread portion which is of such depth and of such flexibility that it is unstable laterally and may flex transversely when subjected to normal load and side thrusts such as those exerted on the tires of a vehicle in rounding curves.

Although several embodiments of the invention have been herein shown and described, it will be understood that numerous details of the construction shown may be altered or omitted without departing from the spirit of this invention, as defined in the following claims.

What I claim is:

1. A tire having a tread comprising a group of relatively thin, laterally unstable, circumferentially extending portions at each side of the median plane thereof, said portions of each group being inclined from the base of said tread in the direction of the median plane, each of said portions being of greater depth than width.

2. A tire having a tread comprising a group of relatively thin, laterally unstable, circumferentially extending portions at each side of the median plane thereof, said groups being inclined in opposite directions relative to the median plane of said tread, each of said portions being of materially greater depth than width.

3. A tire having a tread portion mainly comprising at least one group of flexible, continuously separated parallel ribs extending circumferentially continuously around said tread portion and projecting radially therefrom, each of said ribs being of materially greater depth than width, and being individually weak and laterally unstable, whereby under load and frictional road thrusts said portions are flexed transversely, the separation between said ribs being such that, under load and transversely flexed, said ribs may be engaged with each other.

4. A tire having a tread portion mainly comprising at least one group of flexible, continuously separated parallel ribs extending circumferentially continuously around said tread portion and normally projecting radially therefrom, each of said ribs being of materially greater depth than width, and being individually laterally unstable, whereby under frictional road thrusts said ribs are flexed transversely, the separation between adjacent ribs being less than the width of the ribs so that individual ribs may be flexed into engagement with adjacent ribs.

5. A tire having a tread portion comprising axially spaced, circumferentially extending, laterally stable, stabilizing ribs, and a group of parallel, circumferentially extending, flexible finlike ribs between said stabilizing ribs, each of said flexible ribs being continuously separated from each other, said flexible ribs being of materially greater depth than width and being laterally unstable.

6. A tire having a tread provided substantially throughout its circumference and width with relatively thin substantially parallel circumferential ribs, each of a height materially greater than its thickness, said ribs being individually weak but closely spaced and sufficient in number to carry the weight of normal loads without collapsing, said ribs, when subjected to frictional thrusts in the direction of travel on a road surface, being capable of stretching circumferentially and bowing laterally to dispose substantial portions of the ribs transversely to the direction of travel.

7. A rubber tire having a tread body provided with a normally convex road-engaging face having substantially throughout its width and circumference narrow, closely spaced ribs which are circumferentially continuous and which are substantially parallel and spaced by narrow relatively deep grooves, said ribs being individually weak, elastic and flexible, but sufficient in number to carry the weight of normal loads without substantial distortion, said ribs under load being normally straight but being capable of stretching and bowing to serpentine form when subjected to frictional thrusts in the direction of travel on a road surface.

8. A tire having a tread body provided throughout its circumference and width with a series of unconnected, closely spaced, substantially parallel, narrow circumferential ribs, each rib being of a height materially greater than its thickness, said ribs being sufficient in number to carry the weight of normal loads without excessive distortion, the individual ribs being sufficiently elastic and flexible from their bases to their road-engaging edges to bend laterally, stretch circumferentially and to bow laterally under frictional thrusts applied to the road-engaging edges thereof during their engagement with a road surface, the ribs being capable of lateral deflection under frictional thrusts applied to their road-engaging edges sufficient to shift portions of road-engaging edges of one rib into positions with respect to the adjacent tread body which are normally occupied by the road-engaging edges of other ribs.

9. A tire having a tread body provided throughout is circumference and width with a series of unconnected, closely spaced, substantially parallel, narrow circumferential ribs, each rib being of a height materially greater than its thickness, said ribs being sufficient in number to carry the weight of normal loads without excessive distortion, the individual ribs being sufficiently elastic and flexible from their bases to their road-engaging edges to bend laterally, stretch circumferentially and to bow laterally under frictional thrusts applied to the road-engaging edges thereof during their engagement with a road surface, the ribs being capable of lateral deflection under frictional thrusts applied to their road-engaging edges sufficient to shift portions of road-engaging edges of one rib into positions with respect to the adjacent tread body which are normally occupied by the road-engaging edges of other ribs, said ribs being unconnected, circumferentially continuous, and substantially parallel to the median plane of the tire.

10. A rubber tire having a tread body provided with a road-engaging face composed, substantially throughout its circumferential width, of relatively narrow individual surface areas separated by relatively deep, narrow, circumferentially extending grooves forming closely spaced, individually weak, elastic and flexible road-engaging elements sufficient in number to carry the weight of normal tire loads without substantial distortion but forming, between the tread body and road surface, an elastic and yieldable support capable of permitting a substantial amount of relative movement in any direction between the road-engaging surfaces of the flexible elements and the portion of the tread body to which they are attached when the said flexible elements are subjected to frictional thrusts on a road surface.

HERMAN T. KRAFT.